Feb. 19, 1946. D. RAY 2,395,146
TRANSFER MECHANISM
Original Filed Feb. 21, 1942 2 Sheets-Sheet 1

DON RAY
INVENTOR.
BY
ATTORNEY.

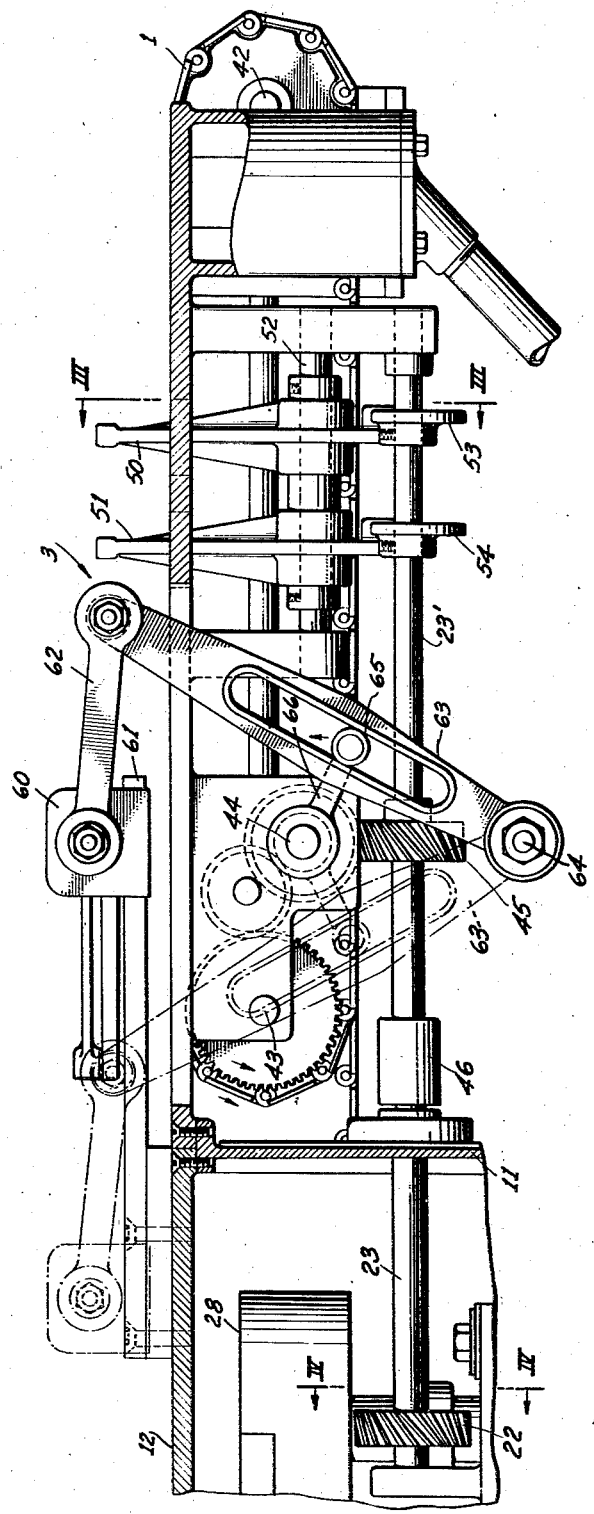

Patented Feb. 19, 1946

2,395,146

UNITED STATES PATENT OFFICE 2,395,146

TRANSFER MECHANISM

Don Ray, Beverly Hills, Calif.

Original application February 21, 1942, Serial No. 431,899. Divided and this application January 22, 1945, Serial No. 573,915

7 Claims. (Cl. 198—24)

This invention relates to a simple, effective mechanism whereby various objects may be positively fed or transferred from a feeding conveyor into a machine. The invention is particularly adapted for use with filling, capping, crimping or sealing machines in which bottles, jars, glasses or other containers are filled, capped, sealed or otherwise treated.

There are numerous machines in which bottles, jars, glasses or the like are handled in a substantially continuous, automatic manner. In order to obtain greatest efficiency, it is necessary that the bottles, jars or other containers be fed to the machine in a predetermined, timed relation to the various operations being performed by the machine. Moreover, since in most instances the containers being fed to the machine are made of glass or other breakable material, it is highly desirable that the feeding device or other transfer means which transfers the bottles or containers from a continuously driven feeding conveyor to the machine be capable of moving the bottles rapidly but without breakage. Such transfer means should move the bottles at a varying speed so that the bottle is not simply thrown at the machine but instead is moved rapidly to a predetermined position and in the last stage of movement the bottle be de-accelerated so as to obviate slippage or breakage.

This invention is particularly directed to a transfer mechanism capable of handling bottles, jars and other containers in a rapid and efficient manner from a supply source or feeding conveyor into a machine in which such bottles or jars or other containers are filled, sealed, labeled, have decorative hoods applied thereto, or the like.

A further object of the invention is to disclose and provide a transfer mechanism which may be operated by the same driving means as that employed in the machine being fed so as to assure delivery of containers to the machine in precise timed relation with the various operations performed by the machine.

Again a further object is to provide a transfer mechanism which will move containers toward the main body of the machine being fed with such containers at a varying rate.

Another object is to provide a transfer mechanism which delivers containers at a decreased velocity and is equipped with automatic means for preventing jamming of the machine being fed.

These and other objects of the invention will appear to those skilled in the art from the following description, reference being had to the appended drawings, in which:

Fig. 2 is a side elevation, partly broken away, of the transfer mechanism.

As previously stated, the transfer mechanism may be used in feeding containers to a great variety of machines. For purposes of example only, the transfer mechanism will be described in connection with a bottle hooding machine of the character shown in Patent No. 2,371,265, issued on an application Serial No. 431,899, filed February 21, 1942, of which patent this application is a division.

Figure 1:
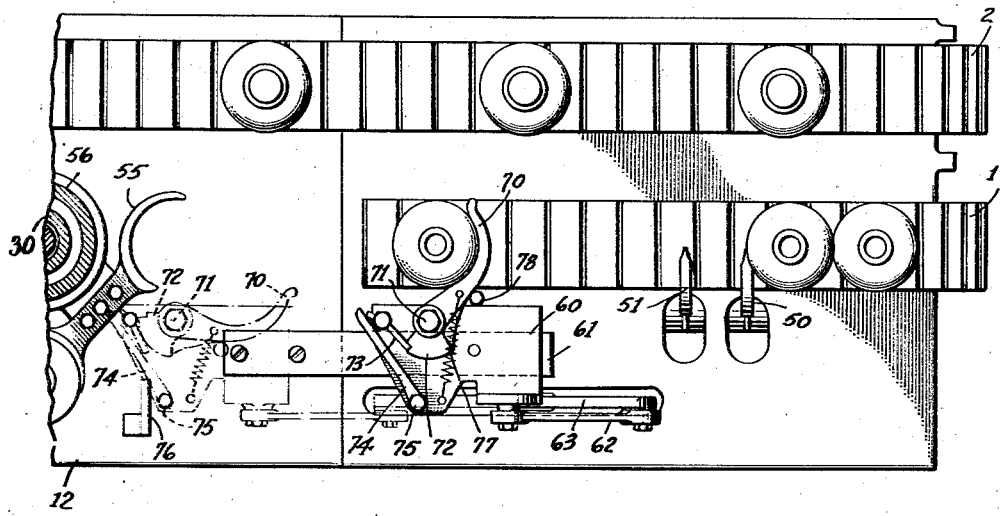
Fig. 1 is a plan view of a main feeding conveyor, the transfer mechanism of this invention and a fragmentary view of a container-handling machine being fed by the transfer mechanism.
Figure 3:
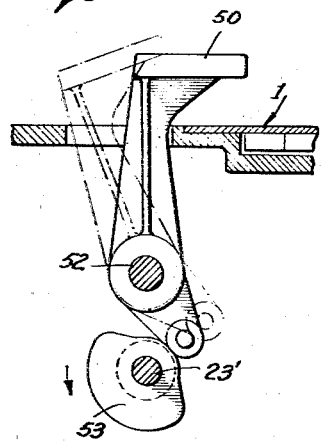
Fig. 3 is a transverse section taken along the plane III—III of Fig. 2.
Figure 4:
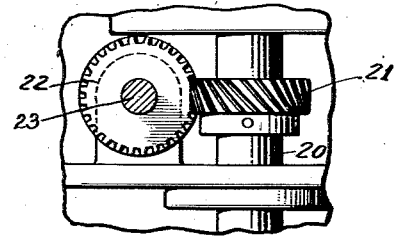
Fig. 4 is a fragmentary view taken along the plane IV—IV of Fig. 2.

As shown in Fig. 1, feeding and discharge conveyors are indicated at 1 and 2 respectively, the transfer device being generally indicated by the numeral 3. The transfer device moves bottles from the feeding conveyor 1 into the machine proper, which may include a work table 12.

The machine may include a main drive shaft 20 carrying a worm gear 21 in engagement with a spiral gear 22 mounted upon a counter-shaft 23 extending through the side wall of the casting 11. The counter-shaft 23 is used for driving the feeding device or transfer mechanism whereas the main drive shaft of the machine may be the shaft 20 or a shaft interlocked therewith. The machine itself may be provided with a column 30 driven in a suitable manner from shaft 20 (as through a Geneva gear) so as to rotate intermittently. The column 30 may be provided with arms 55 adapted to grasp, hold and convey the bottles or containers over the work table 12.

The transfer mechanism may comprise a framework suitably supported adjacent the work table of the machine. This framework may include the transverse shafts 42 and 43 carrying drive wheels for driving the feeding conveyor 1. This feeding conveyor may be of any desired type. The drive shaft 43 may be driven by suitable gearing from a stub shaft 44 which is driven in turn by means of a spiral gear 45 carried by a counter-shaft 23' suitably connected to the counter-shaft 23 within the base housing of the machine as, for example, by means of a coupling 46.

The drive shaft 43, by means of other gearing not shown, may also drive the discharge conveyor 2 in the opposite direction and in a manner well understood by those skilled in the art.

In order to make certain that individual containers are transferred from the feeding conveyor to the machine (and to eliminate the possibility that two containers may be simultaneously fed), two longitudinally spaced stop arms 50 and 51 extend from beneath the upper lay of the feeding conveyor 1, these stop arms being carried by levers pivoted as at 52. The lower ends of these levers are provided with rollers riding cams 53 and 54 respectively, the cams being mounted upon the counter-shaft 23'. Springs (not shown) may be provided for urging the stop arms into position above the feeding conveyor 1, as shown in Fig. 1.

It will be understood that the linear speed of the feeding conveyor 1 is slightly in excess of the speed of bottles around the work table 12. The stop arms are automatically timed by the cams 53 and 54 so as to liberate bottles in precise timed relation with the speed of the machine.

The conveyor 1 terminates short of the work table 12 as best seen in Fig. 1 and a transfer mechanism, generally indicated by the numeral 3, is provided for positively feeding bottles onto the work table and into a desired holding arm, such as the arm 55 carried by a sleeve 56 attached to the supporting column 30. Such transfer device may including a reciprocating head 60 slidable alongside the conveyor 1 upon a guide rail 61. Reciprocating motion is imparted to the head 60 by means of a pivoted link 62 and a slotted link 63 pivoted at its lower end to a fixed pin 64. The slotted link 63 receives a roller 65 carried by one end of an arm 66 mounted upon the stub shaft 44.

Fig. 2 illustrates the transfer mechanism in two extreme positions and it will be noted that when the shaft 44 is rotated in the direction of the arrow, the reciprocating head 60 will move from the feeding conveyor toward the main body of the machine at a varying rate but it will return at a much more rapid rate.

The reciprocating head 60 is provided with a smoothly curved transfer arm 70 pivoted to the head 60 at 71 and provided with a rearwardly extending latching boss 72 adapted to engage a pivoted latch dog 73. The head also carries a trip arm 74 pivoted at 75.

When the entire reciprocating head is at its dotted position (Fig. 1) the trip arm 74 engages the fixed stop 76 and releases the latch dog 73 from its engagement with the latch boss 72. The spring 77 pulls the transfer arm into a retracted position, shown in dotted lines. When the reciprocating head 60 moves back into its original position, the transfer arm engages a fixed pin 78 and again locks in extended position, the latch dog 73 being urged into latching position by a spring (not shown).

It will be evident, therefore, that supply of bottles to the machine is automatically assured, the two stop arms 50 and 51 operating intermittently and sequentially so as to permit only one bottle to pass at a time. While arm 51 liberates a bottle, arm 50 holds a bottle back in reserve; after arm 51 returns to above the conveyor, arm 50 moves to permit a bottle to advance to arm 51 and again returns to above the conveyor to hold back further bottles. The transfer arm 70 extends in back of a bottle and then moves forward to transfer the bottle from the feeding conveyor 1 onto the work table 12 and into the holding arm 55 and in such transferring movement picks up speed gradually instead of suddenly and delivers the bottle at a decreased velocity so as to prevent breakage of the bottle against the holding arm. Positive feeding is assured by the device herein described.

I claim:

1. A machine for handling containers comprising: a work table, a continuously driven feeding conveyor leading to the work table, a transfer mechanism for transferring containers from the feeding conveyor onto the work table in proper spaced relation, said transfer mechanism including a reciprocable head movable along the path of the feeding conveyor, a transfer arm pivotally mounted on the head and adapted to extend over the feeding conveyor, latch means carried by the head for holding the arm above the conveyor during the feeding stroke, means for releasing the latch at the end of the feeding stroke, and spring means for holding the arm in retracted position during the return stroke; and a single power source operably associated with the conveyor and head for continuously driving the conveyor and reciprocating the head.

2. A machine for handling containers comprising: a work table, a continuously driven feeding conveyor leading to the work table, means for driving the conveyor, a transfer mechanism for transferring containers from the feeding conveyor onto the work table in proper spaced relation, said transfer mechanism including a reciprocable head movable along the path of the feeding conveyor, a transfer arm pivotally mounted on the head and adapted to extend over the feeding conveyor, latch means carried by the head for holding the arm above the conveyor during the feeding stroke, means for releasing the latch at the end of the feeding stroke, and spring means for holding the arm in retracted position during the return stroke; means for reciprocating the head, said means including a slotted lever connected to the head, a crank arm cooperating with the slot in said lever, and means for driving said crank arm and said conveyor in timed relation.

3. A machine for handling containers comprising: a work table, a continuously driven feeding conveyor leading to the work table, a transfer mechanism for transferring containers from the feeding conveyor onto the work table in proper spaced relation, said transfer mechanism including a reciprocable head movable along the path of the feeding conveyor, a transfer arm pivotally mounted on the head and adapted to extend over the feeding conveyor, latch means carried by the head for holding the arm above the conveyor during the feeding stroke, means for releasing the latch at the end of the feeding stroke, and spring means for holding the arm in retracted position during the return stroke; stop means pivotally carried adjacent the feeding conveyor, said stop means being adapted to extend above the conveyor in advance of the transfer arm; and a single power source operably associated with the conveyor, stop means and head for continuously driving the conveyor and for reciprocating the head and actuating the stop means in timed relation thereto.

4. A machine for handling containers comprising: a work table, a continuously driven feeding conveyor leading to the work table, a transfer mechanism for transferring containers from the feeding conveyor onto the work table in proper spaced relation, said transfer mechanism including a reciprocable head movable along the path of the feeding conveyor, a transfer arm pivotally mounted on the head and adapted to extend over the feeding conveyor, latch means carried by the head for holding the arm above the conveyor during the feeding stroke, means for releasing the latch at the end of the feeding stroke, and spring means for holding the arm in retracted position during the return stroke; and means for reciprocating the head at a variable speed, the feeding stroke being of longer duration than the return stroke.

5. A machine for handling containers comprising: a work table, a continuously driven feeding conveyor leading to the work table, a transfer mechanism for transferring containers from the feeding conveyor onto the work table in proper spaced relation, said transfer mechanism including a reciprocable head movable along the path of the feeding conveyor, a transfer arm pivotally mounted on the head and adapted to extend over the feeding conveyor, latch means carried by the head for holding the arm above the conveyor during the feeding stroke, means for releasing the latch at the end of the feeding stroke, spring means for holding the arm in retracted position during the return stroke, and a pair of movable stop arms adapted to extend above the conveyor in advance of the transfer arm; and means for reciprocating the head and actuating the stop arms in timed relation thereto to feed containers individually to the transfer mechanism.

6. A machine for handling containers comprising: a work table, a continuously driven feeding conveyor leading to the work table, a transfer mechanism for transferring containers from the feeding conveyor onto the work table in proper spaced relation, said transfer mechanism including a guide rail paralleling the feeding conveyor and adjacent the delivery end thereof, a reciprocable head on said guide rail, a transfer arm pivotally mounted on the head; means for moving the transfer arm into position extending above the feeding conveyor at the end of a return stroke, latch means carried by the head for holding the transfer arm above the conveyor during a feeding stroke, means for releasing the latch means at the end of the feeding stroke, means for normally holding said transfer arm in a retracted position, and means for reciprocating the head at a variable speed, the feeding stroke being of longer duration than the return stroke.

7. A machine for handling containers comprising: a work table, a continuously driven feeding conveyor leading to the work table, a transfer mechanism for transferring containers from the feeding conveyor onto the work table in proper spaced relation, said transfer mechanism including a guide rail paralleling the feeding conveyor and adjacent the delivery end thereof, a reciprocable head on said guide rail, a transfer arm pivotally mounted on the head; means for moving the transfer arm into position extending above the feeding conveyor at the end of a return stroke, latch means carried by the head for holding the transfer arm above the conveyor during a feeding stroke, means for releasing the latch means at the end of the feeding stroke, means for normally holding said transfer arm in a retracted position, a pair of movable stop arms adapted to extend above the conveyor in advance of the transfer arm and means for reciprocating the head and actuating the stop arms in timed relation thereto to feed individual containers to the transfer mechanism and to the work table.

DON RAY.